（12） United States Patent
Caraway (10) Patent No.: US 7,370,433 B1
(45) Date of Patent: May 13, 2008

(54) TAPE MEASURE MOUNTABLE DIGITAL RECORDER DEVICE

(76) Inventor: Albert Caraway, 170 CR 4010, Decatur, TX (US) 76234

( * ) Notice: Subject to any disclaimer, the term of this patent is extended or adjusted under 35 U.S.C. 154(b) by 0 days.

(21) Appl. No.: 11/384,933

(22) Filed: Mar. 20, 2006

(51) Int. Cl.
*G01B 3/10* (2006.01)
(52) U.S. Cl. .......................................... 33/768; 33/770
(58) Field of Classification Search ................ 33/768, 33/760, 769, 770, 755–759, 761–767; 369/75.11
See application file for complete search history.

(56) References Cited

U.S. PATENT DOCUMENTS

| | | | |
|---|---|---|---|
| 5,206,486 A | | 4/1993 | Stephens et al. |
| 5,230,159 A | * | 7/1993 | Lipsey .......................... 33/760 |
| 5,319,805 A | * | 6/1994 | Holcomb et al. ............ 455/128 |
| 5,379,524 A | | 1/1995 | Dawson |
| 5,396,578 A | | 3/1995 | Howes |
| 5,721,537 A | | 2/1998 | Protas |
| 5,802,732 A | | 9/1998 | Malone |
| 5,810,420 A | * | 9/1998 | Welling ...................... 296/97.5 |
| 5,826,235 A | | 10/1998 | Harman |
| 5,983,514 A | | 11/1999 | Lindsey |
| 6,259,794 B1 | * | 7/2001 | Dobbins ...................... 381/124 |
| 6,289,253 B1 | * | 9/2001 | Iida .............................. 700/94 |
| 6,614,357 B1 | * | 9/2003 | Gibson et al. .............. 340/692 |
| 6,658,755 B2 | | 12/2003 | Arlinsky |
| 6,693,515 B2 | * | 2/2004 | Clapper ................... 340/384.7 |
| 6,868,571 B1 | * | 3/2005 | Fischer et al. ................ 7/164 |
| 7,076,885 B2 | * | 7/2006 | Potter .......................... 33/768 |
| 2006/0059704 A1 | * | 3/2006 | Wilson ........................ 33/761 |

FOREIGN PATENT DOCUMENTS

| | | |
|---|---|---|
| GB | 349.146 | 5/1931 |
| WO | WO02/22405 | 3/2002 |

\* cited by examiner

*Primary Examiner*—G. Bradley Bennett
*Assistant Examiner*—Amy Cohen Johnson
(74) *Attorney, Agent, or Firm*—Winstead PC (57) ABSTRACT

A device for recording audio data including a housing and means positioned on the housing for recording audible data, means for repositioning to a prerecorded audio message. The device further includes means positioned on the housing for playing back the recorded audible. The device is connected to a measurement apparatus via a connecting means. A user is able to record, rewind and playback the audio data while operating the measurement apparatus.

20 Claims, 11 Drawing Sheets

TAPE MEASURE MOUNTABLE DIGITAL RECORDER DEVICE

BACKGROUND OF THE INVENTION

1. Field of the Invention

The present invention relates generally to audio recording systems and, more specifically, to an audio recording system in the form of an attachable cover. The attachable cover may be releasably fastened to measuring devices for recording a plurality of audible measurements in detailed projects. The audio recording device includes recording, rewinding and playback mechanisms which will allow the user of the measuring device to record all pertinent data obtained during the measuring process.

2. Description of the Prior Art

There are other data and audio recording device designed for tape measures and such. Typical of these is U.S. Pat. No. 349,146 issued to Jennings et al on Mar. 1, 1930.

Another was issued to Stephans et al on Apr. 27, 1993 as U.S. Pat. No. 5,206,486 and still yet another patent issued to Dawson on Jan. 10, 1995 as U.S. Pat. No. 5,379,524. Yet another U.S. Pat. No. 5,396,578, was issued to Howes on Mar. 7, 1995 and still yet another was issued on Feb. 24, 1998 to Protas as U.S. Pat. No. 5,721,537.

Another patent was issued to Malone on Sep. 8, 1998 as U.S. Pat. No. 5,802,732. Yet another U.S. Pat. No. 5,826,235, was issued to Harman on Oct. 20, 1998. Another was issued to Lindsey on Nov. 16, 1999 as U.S. Pat. No. 5,983,514 and still yet another was issued on Dec. 9, 2003 to Arlinsky as U.S. Pat. No. 6,658,755.

Another patent was issued to Campbell on Mar. 21, 2002 as International Publication No. WO 02/22405.

U.S. Pat. No. 349,146

Inventor: Jennings et al

Issued: Mar. 1, 1980

This invention relates to sound recording and reproducing devices for gramophone records and in particular to devices known as electro-magnetic recorders and pick-ups.

When in operation the recording or reproducing device is generally supported by a carrying arm and it is found that owing to its inertia and to the compliance of its elements this combination has a resonance of from 100-200 cycles which naturally disadvantageously affects the quality of the recording or reproduction, particularly in the case of a pick-up since tracking is upset at that frequency, and it is the object of this invention to reduce that resonance to a point below 50-60 cycles at which its effect will no longer be perceptible.

U.S. Pat. No. 5,206,486

Inventor: Richard J. Stephens et al

Issued: Apr. 27, 1993

A data recorder includes a unitary housing such as comprised of a molded plastic having an open upper portion, a removable lower cover, and a data card receiving arrangement at one end thereof. The data card receiving arrangement includes a narrow slot of precisely fixed dimensions for preventing the insertion of more than one data card at a time. Disposed within the housing are various flat template members arranged in a layered array, with each template having a plurality of spaced apertures therein. Upon full insertion of a data card in the recorder, the leading edge of the card urges a forward biased mask member to full aft position for aligning the apertures of the various layered members allowing the tip of a stylus to be inserted through aligned apertures in the mask and template members to permit severing of chips or punch portions from the data card, which may be either scored or un-scored. The recorder includes a seal/lock arrangement and means for removing a hung-up card without disassembling the recorder. Several telescoping stylus designs are contemplated, one employing a trigger mechanism which activates a pointed, inner telescoping member when a predetermined force is manually applied to the stylus, causing the inner member to pierce the data card and remove a chip there from in a manner which provides an aural and tactile indication to the user that the data card has been punched.

U.S. Pat. No. 5,379,524

Inventor: Melvin Dawson

Issued: Jan. 10, 1995

An improved versatile tape measure tool is provided, which consists of an elongated strip of tape marked off in a linear scale for taking measurements. A casing is for storing the tape therein in a coiled spring biased condition with the tape being extendable through a first end wall of the casting for measuring. A plurality of components are built into the casing, to help in the measuring and cutting to size of plasterboard, so that the plasterboard can be used to cover interior walls and ceilings.

U.S. Pat. No. 5,396,578

Inventor: James P. Howes

Issued: Mar. 7, 1995

By providing an audio recording and playback system with a measuring device, a unique integrated system is realized which enables users to easily record measured distances and have the measured distance subsequently played back for use. In the preferred embodiment, the audio recording and play back system is constructed in cooperative association with a tape measuring device and is automatically powered whenever the tape is extended from the housing. Then, by pressing an activation switch and orally enunciated information is automatically stored in an associated analog storage array for being subsequently played back whenever required by the user. In this way, an easily employed and particularly convenient system is realized which eliminates the need for manually recording measurements.

U.S. Pat. No. 5,721,537

Inventor: Marlyne Protas

Issued: Feb. 24, 1998

A hand-held device contains a paging receiver and a microphone to accept dictation of messages. A common digital data store holds received transmissions and dictated messages.

U.S. Pat. No. 5,802,732

Inventor: Robert D. Malone

Issued: Sep. 8, 1998

A combination measuring instrument such as an elongated and retractable tape measuring device is associated with an audio recording apparatus which enables a user to record measurements observed on the tape measure device simultaneously with the act of performing the measurement and which permits the subsequent playback of the recorded information for use in a later discrete step of manufacturing or utilizing the recorded information. The recording device may be positioned in or on the housing of the measuring device so that the user may conveniently record the observed measurement orally for a later reuse.

U.S. Pat. No. 5,826,235

Inventor: Jeffrey A. Harman

Issued: Oct. 20, 1998

A communication package has, enclosed in a storage disc, a voice chip connected by power input bus terminals to a renewable, battery power system, which provides easy battery accessibility. The storage disc preferably contains an acoustically resonant chamber and diffusion apparatus and preferably contains a removable barrier between the power system and the power input bus terminals that must be removed before the voice chip can be energized. A voice message is stored in the communication package by recording the voice message into a recording unit, replaying the voice message until the replay is satisfactory, converting the message to a compressed, digital "sound file" and then downloading this "sound file" onto the voice disc. Identifying information is converted into a compressed digital "text file" and transmitted with the "sound file" to be displayed as a visual identification of the "sound file".

U.S. Pat. No. 5,983,514

Inventor: Warren Mack Lindsey

Issued: Nov. 16, 1999

A tape measure including an electronic keypad and display for recording and viewing measurements is disclosed. The keypad includes up and down buttons, save and recall buttons, a set button and a clear/on button. The up and down button are used to selectively increment and decrement numeric values representing units of measurements, which are displayed on the display. Measurements are entered and displayed in feet, inches, and sixteenths of an inch in the English system, or in metric units. After manually measuring a distance using a coiled measuring tape, a user presses the up and down button to specify the distance measured, then presses the save button to store the measurements. The recall button is used to recall previously stored measurements.

U.S. Pat. No. 6,658,755

Inventor: David Arlinsky

Issued: Dec. 9, 2003

A measuring device having a tape for taking angle and length measurements, and capable of providing a user discerning indication of the angular orientation of its tape relative in any given extended measuring state relative to a predetermined orientation, for example, the horizontal. The measuring device preferably is capable of reading out one or more measurements associated with any given extended measuring state, and transmitting them to a remote device. The measuring device preferably has one or more finger depressible soft keys each programmable with a user specified function downloaded from a host computer.

International Publication Number WO 02/22405 A2

Inventor: Douglas, C. Campbell

Issued: Mar. 21, 2002

A digital memo recorder for a vehicle interior is disclosed. The digital memo recorder includes a digital audio recorder couple able to an accessory unit of the vehicle interior. The digital audio recorder is configured to receive audible sounds from the vehicle interior. The digital memo recorder further includes a memory interface configured to receive a removable memory unit. The digital audio recorder is configured to digitize the audible sounds and to store the digitized data on the removable memory.

While these audio recording may be suitable for the purposes for which they were designed, they would not suitable for the purposes of the present invention, as hereafter described.

SUMMARY OF THE PRESENT INVENTION

The present invention relates generally to audio recording systems and, more specifically, to an audio recording system in the form of an attachable cover. The attachable cover may be placed over measuring devices for recording a plurality of audible measurements in detailed projects. The audio recording device includes recording and playback mechanisms which will allow the user of the measuring device to record all pertinent data obtained during the measuring process.

A primary object of the present invention is to overcome the shortcomings of the prior art.

Another secondary object of the present invention is to provide an audio recording and playback device that may be affixed to a tape measure or other measuring devices.

Another object of the present invention is to provide an audio recording and playback device having means for releasably fastening the device to a tape measure.

Yet another object of the present invention is to provide an audio recording and playback device with the ability to record voice data.

Still yet another object of the present invention is to provide an audio recording and playback device that further has the ability to record a plurality of entries and store the entries for later use.

Another object of the present invention is to provide an audio recording and playback device having an internal power source.

Yet another object of the present invention is to provide an audio recording and playback device having an indicator light for notifying a user that the recording process has been at least one of initiated or halted.

Still yet another object of the present claimed invention is to provide an audio recording and playback device having a removable and replaceable power source.

Another object of the present invention is to provide an audio recording and playback device that is simple and easy to use.

Yet another object of the present invention is provide an audio recording and playback device that is inexpensive to manufacture.

Additional objects of the present invention will appear as the description proceeds.

The present invention overcomes the shortcomings of the prior art by providing an audio recording device with playback means that may be affixed temporally to the standard tape measure device of users choice.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the digital recorder device of the present invention. With regard to the reference numerals used, the following numbering is used throughout the various drawing Figures.

- 10 digital recorder device of the present invention
- 11 directional arrows
- 12 microphone
- 14 play button
- 15 rewind button
- 16 record button
- 18 LED
- 20 speaker
- 22 user
- 23 housing
- 24 tape measure
- 26 attachment fastener
- 28 battery compartment
- 30 battery
- 32 processor
- 34 memory
- 36 speaker
- 38 circuit board assembly

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Turning now descriptively to the drawings, in which similar reference characters denote similar elements throughout several views, FIGS. 1 through 9 illustrate the digital recorder device which is indicated generally by the numeral 10.

Figure 1:
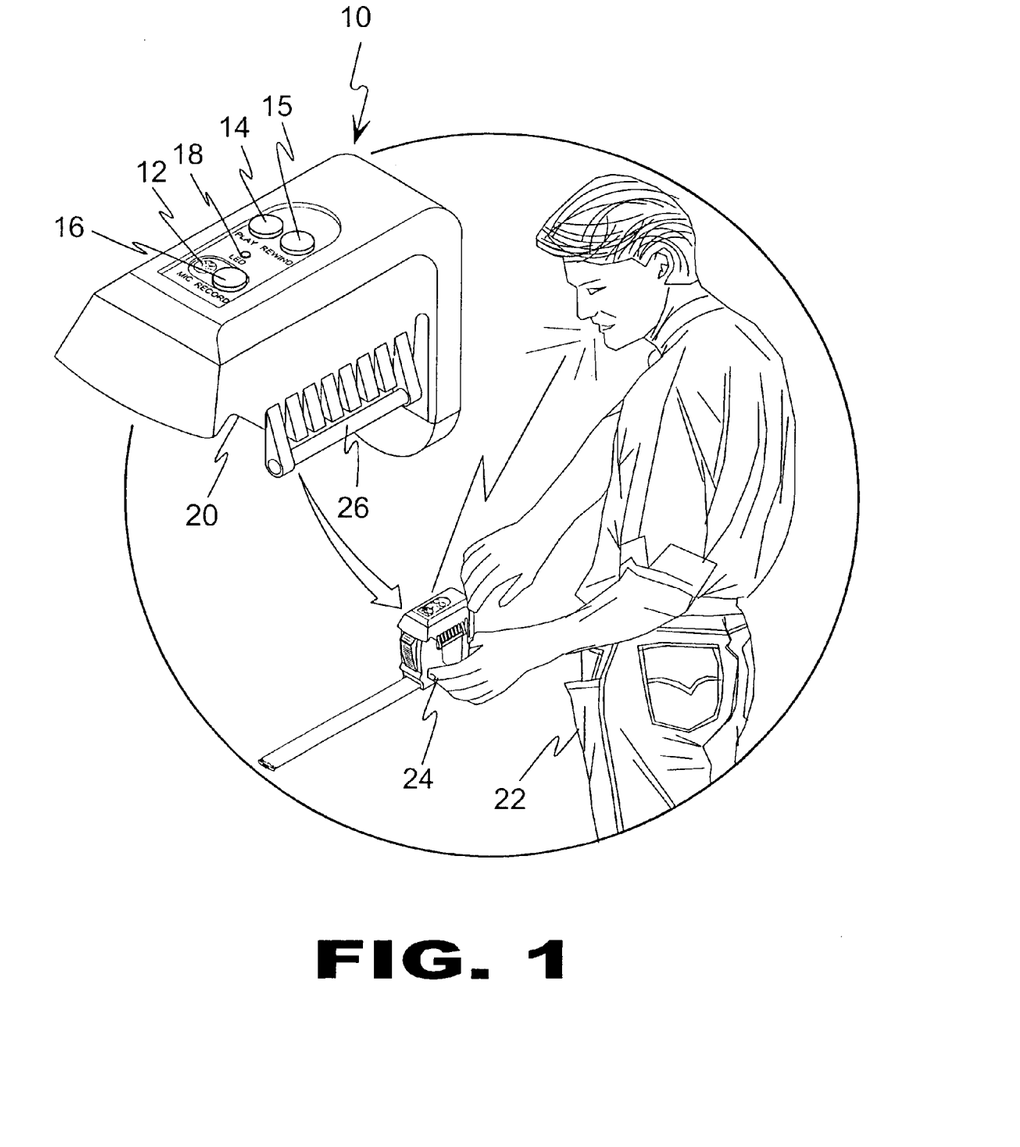
FIG. 1 is an illustrative view of the digital recorder device of the present invention in use.

FIG. 1 is an illustrative view of the digital recorder device of the present invention in use. The digital recorder device 10 of the present invention provides a user 22 with the ability to easily record measurements made using a measurement device. As shown throughout the application the measurement device is a tape measure 24 and will be referred to as such throughout this specification. However, the measurement device may include any device able to measure at least one of size, dimension and distance. The digital recorder device 10 of the present invention includes a housing 23 and a clipping apparatus 26 positioned therein. The housing 23 has the clipping apparatus 26 positioned on the exterior housing with a removable pin whereby said digital recorder device 10 can be releasably fastened to a measurement device 24. The digital recorder device 10 further includes a playback button 14, a record button 16 and a rewind button 15 positioned on a first side of the housing 23. The digital recorder device 10 also includes a speaker 20, microphone 12 and an indicator light 18 positioned proximate to the operation buttons 14, 15 and 16.

The digital recorder device 10 is fixed to a tape measure 24 using clipping apparatus 26. Clipping apparatus 26 creates a secure connection between digital recorder device 10 and tape measure 24 by fastening to tape measure 24 clip.

The housing 23 provides for an enhanced grip allowing a more secure connection to the tape measure 24 and a better grip for a user holding the digital recorder device 10.

Depression of record button 16 initiates the recording process of digital recorder device 10. Upon commencement of the recording process LED 18 is illuminated for notification of entry into the recording phase. A user 22 then speaks and the microphone 12 records all available audio data for the period in which record button 16 is depressed. The release of record button 16 from the depressed position ceases the recording process and illumination of LED 18. Depression of the rewind button 15 causes the digital recorder to reposition to a prerecorded position within the digital data. Depression of playback button 14 initiates the playback process of digital recorder device 10. The playback process causes the recorded messages to be output through a speaker 20. Alternatively, the record button 16 need not be continually depressed, wherein pressing the button 16 a first time causes recording to begin and depressing the record button 16 a second time causes recording to stop.

Figure 2:
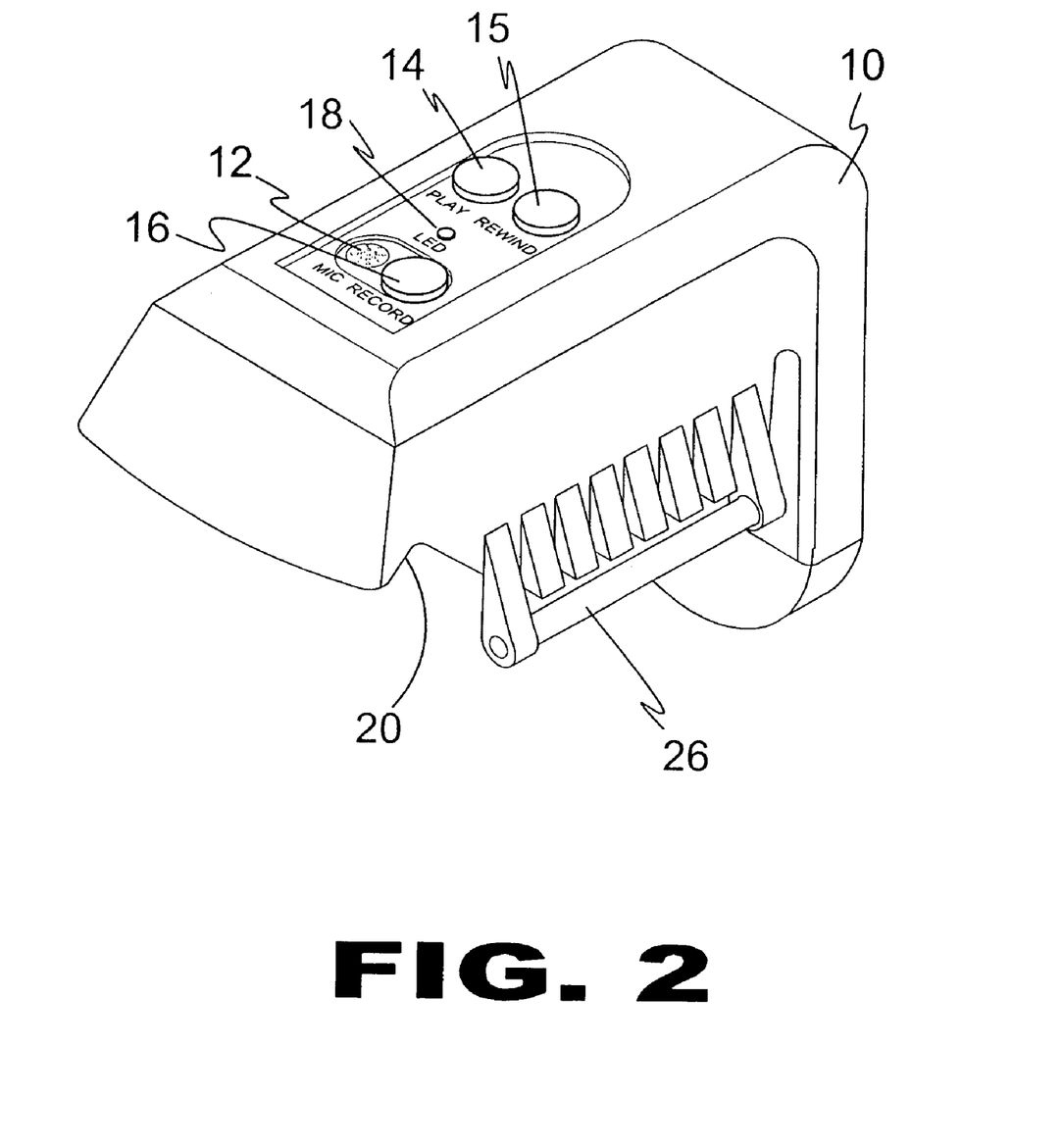
FIG. 2 is a perspective view of the digital recorder device of the present invention.

FIG. 2 is a perspective view of the digital recorder device of the present invention. The digital recorder device 10 of the present invention provides the ability to easily record measurements made using a measurement device. However, the measurement device may include any device able to measure at least one of size, dimension and distance. The digital recorder device 10 of the present invention includes a housing 26 having a clipping apparatus 26 positioned thereon. The digital recorder device 10 further includes a playback button 14, a record button 16 and a rewind button 15 positioned on a first side of the housing 26. The digital recorder device 10 also includes a speaker 12 and microphone 12 and an indicator light 18 positioned proximate to the operation buttons 14, 16.

The digital recorder device 10 is fixed to a tape measure 24 using clipping apparatus 26. Clipping apparatus 26 creates a secure connection between digital recorder device 10 and tape measure 24 by applying pressure against the sides of tape measure 24. The housing 23 provides for an enhanced grip allowing a more secure connection to the tape measure 24 and a better grip for a user holding the digital recorder device 10.

Depression of record button 16 initiates the recording process of digital recorder device 10. Upon commencement of the recording process LED 18 is illuminated for notification of entry into the recording phase. A user 22 then speaks and the microphone 12 records all available audio data for the period in which record button 16 is depressed. The release of record button 16 from the depressed position ceases the recording process and illumination of LED 18. Depression of the rewind button 15 repositions to the beginning of the recorded data Depression of playback button 14 initiates the playback process of digital recorder device 10. The playback process causes the previously recorded messages to be output through a speaker 12. Alternatively, the record button 16 need not be continually depressed, wherein pressing the button 16 a first time causes recording to begin and depressing the record button 16 a second time causes recording to stop.

Figure 3:
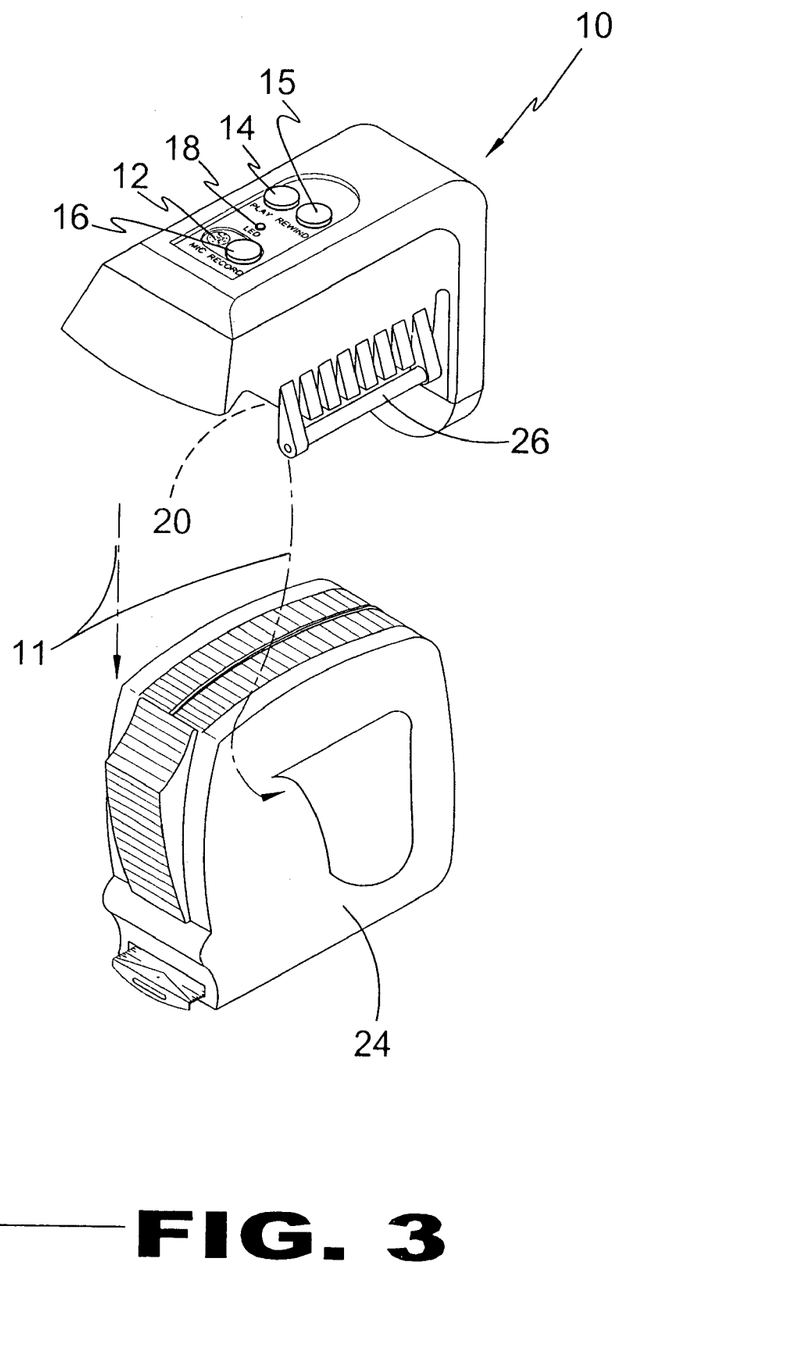
FIG. 3 is a perspective view of the digital recorder device of the present invention during installation.

FIG. 3 is a perspective view of the digital recorder device of the present invention during installation. The digital recorder device 10 of the present invention provides the ability to easily record measurements made using a measurement device. As shown throughout the application the measurement device is a tape measure 24 and will be referred to as such throughout this specification. However, the measurement device may include any device able to measure at least one of size, dimension and distance. The digital recorder device 10 of the present invention includes housing 23 having a clipping apparatus 26 positioned therein. The digital recorder device 10 further includes a playback button 14, a record button 16 and a rewind button 15 positioned on a first side of the housing 23. The digital recorder device 10 also includes a speaker 20 and microphone 12 and an indicator light 18 positioned proximate to the operation buttons 14, 15 and 16.

The digital recorder device 10 is fixed to a tape measure 24 using clipping apparatus 26. Clipping apparatus 26 creates a secure connection between digital recorder device 10 and tape measure 24 through incorporation of a rod within clipping apparatus 26 that is secured to tape measure 24 clip. The housing 23 provides for an enhanced grip allowing a more secure connection to the tape measure 24 and a better grip for a user holding the digital recorder device 10.

Figure 4:
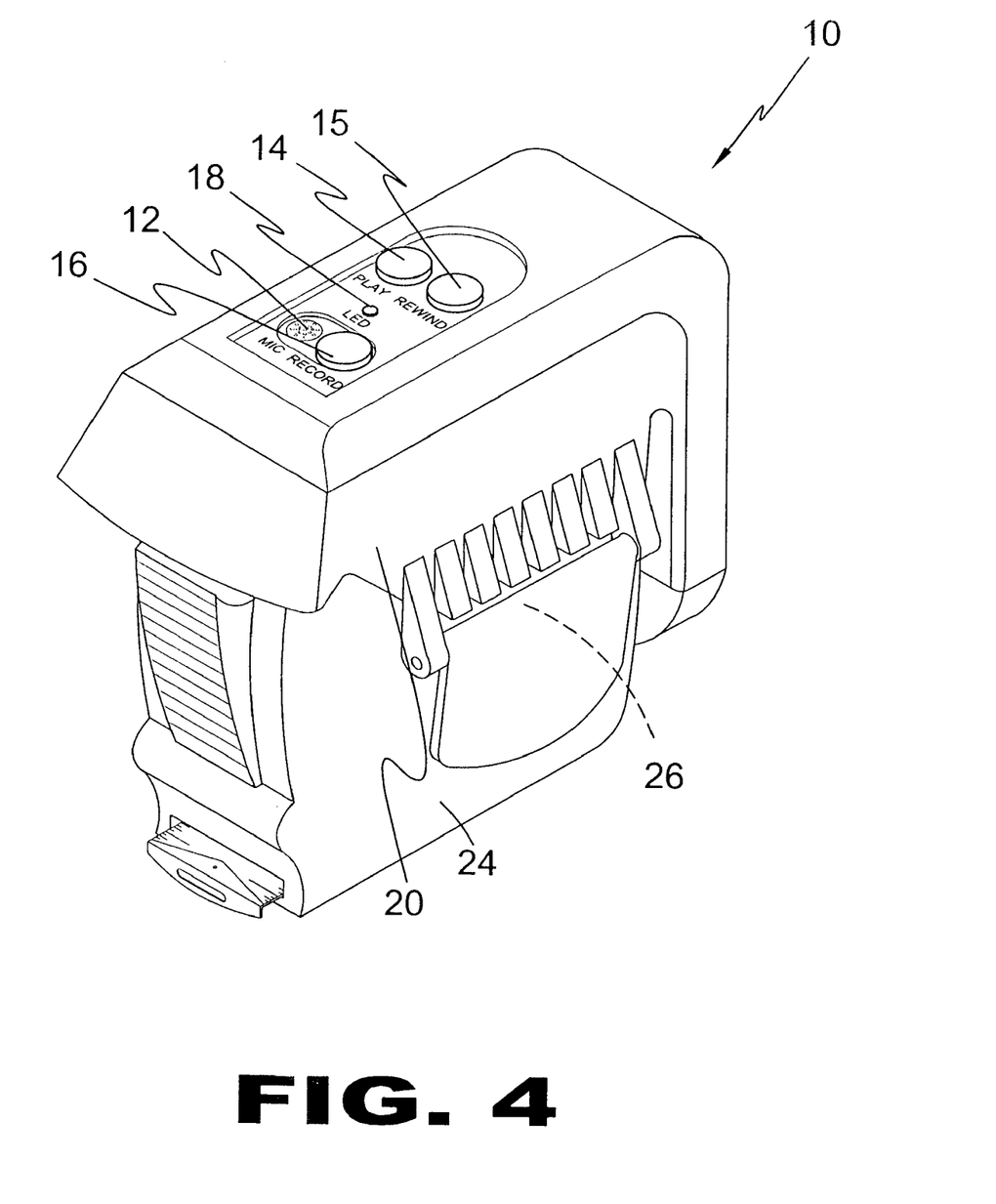
FIG. 4 is a perspective view of the digital recorder device of the present invention after installation.

FIG. 4 is a perspective view of the digital recorder device of the present invention after installation. The digital recorder device 10 of the present invention provides the ability to easily record measurements made using a measurement device. As shown throughout the application the measurement device is a tape measure 24 and will be referred to as such throughout this specification. However, the measurement device may include any device able to measure at least one of size, dimension and distance. The digital recorder device 10 comprising a housing 23 having means for attachment to tape measure 24 via fastener 26. Also positioned on the top exterior surface are means for recording, means for repositioning to a prerecorded message and means for playback of said message. The digital recorder device 10 further includes a playback button 14, record button 16 and rewind button 15 positioned on a first side of the housing 23. The digital recorder device 10 also includes a speaker 20 and microphone 12 and an indicator light 18 positioned proximate to the operation buttons 14, 15 and 16.

Depression of record button 16 initiates the recording process of digital recorder device 10. Upon commencement of the recording process LED 18 is illuminated for notification of entry into the recording phase. A user 22 then speaks and the microphone 12 records all available audio data for the period in which record button 16 is depressed. The release of record button 16 from the depressed position ceases the recording process and illumination of LED 18. Depression of the rewind button 15 causes the digital recorder to reposition to a prerecorded position within the digital data. Depression of playback button 14 initiates the playback process of digital recorder device 10. The playback process causes the previously recorded messages to be output through a speaker 20. Alternatively, the record button 16 need not be continually depressed, wherein pressing the button 16 a first time causes recording to begin and depressing the record button 16 a second time causes recording to stop.

Figure 5:
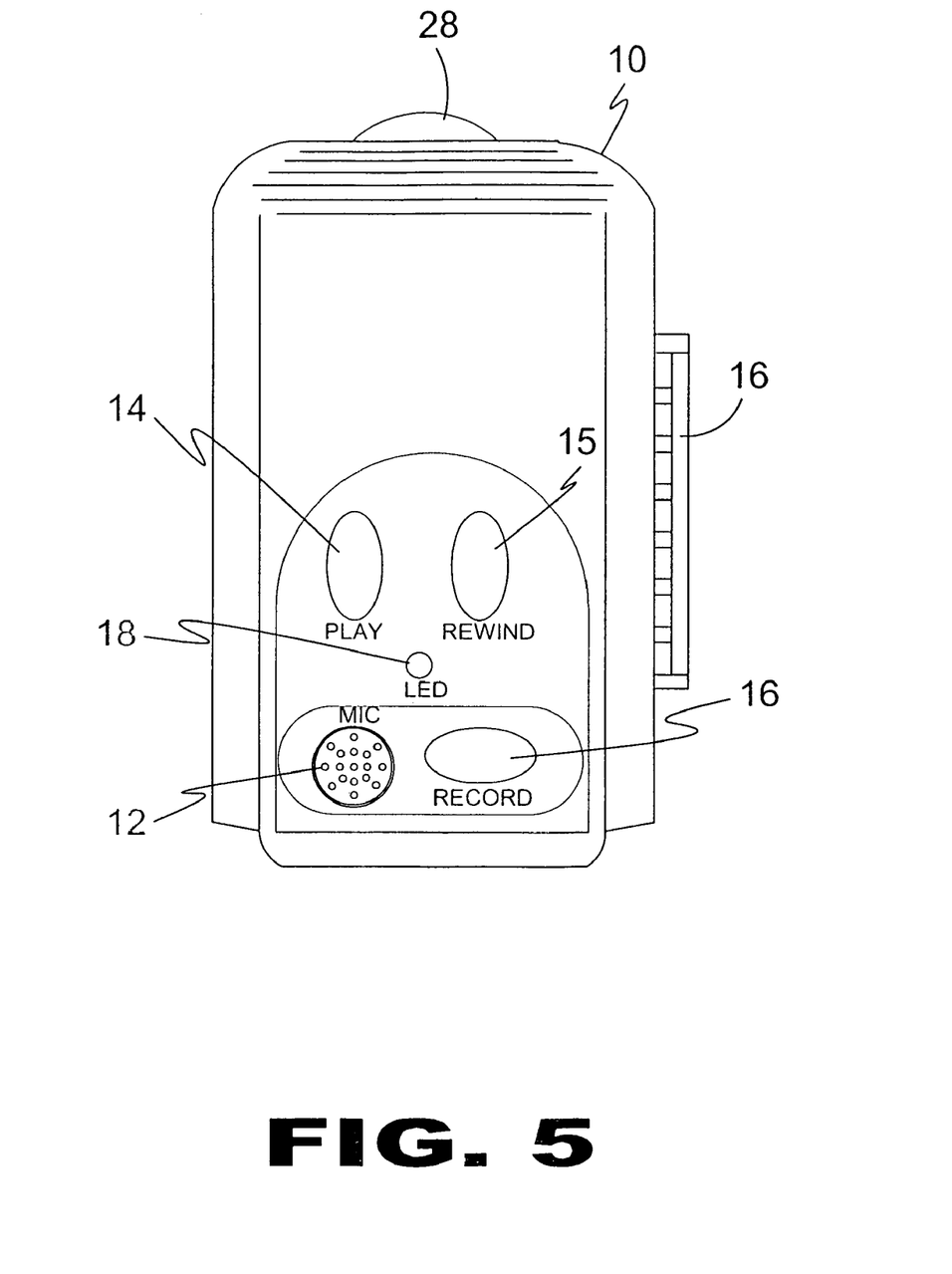
FIG. 5 is a top view of the digital recorder device of the present invention.

FIG. 5 is a top view of the digital recorder device of the present invention. The digital recorder device 10 of the present invention provides the ability to easily record measurements made using a tape measure 24, shown in FIG. 1 in a preferred embodiment. The top of the digital recorder device 10 contains record button 16, rewind button 15, playback button 14, speaker 12 and LED 18. The power source resides within a battery compartment 28 located within digital recorder device 10.

Figure 6:
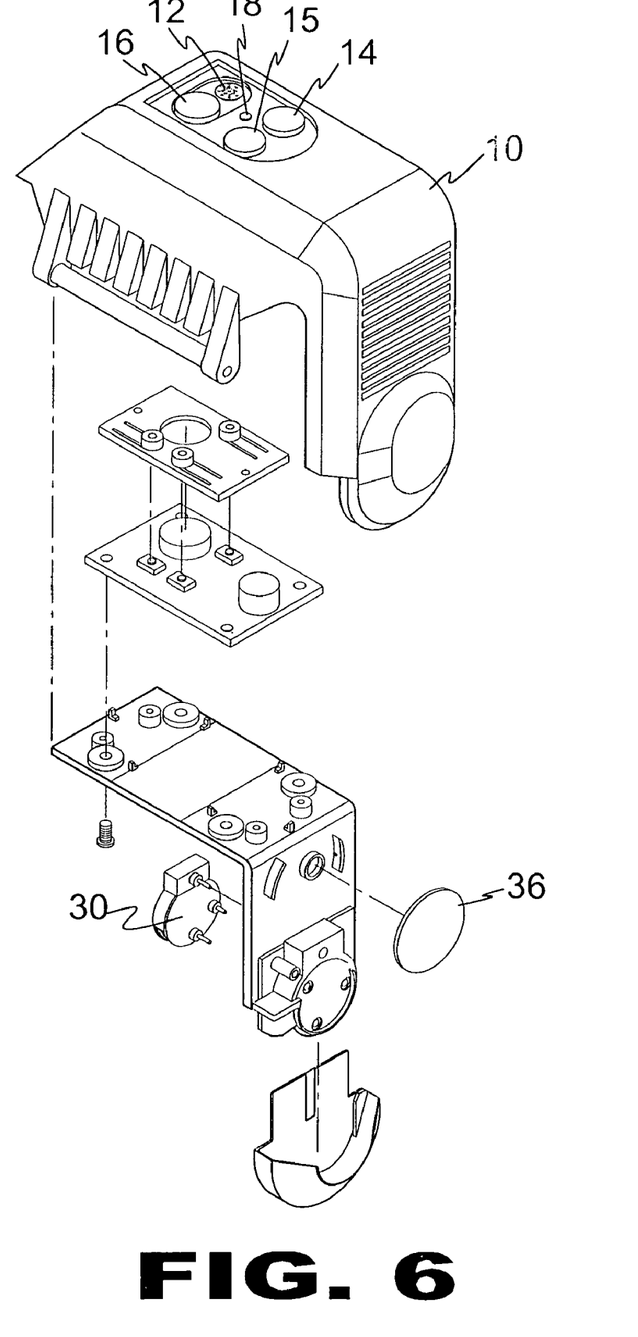
FIG. 6 is front view of the digital recorder device of the present invention.

FIG. 6 is front view of the digital recorder device of the present invention. The digital recorder device 10 of the present invention provides the ability to easily record measurements made using a tape measure 24, shown in FIG. 1 in a preferred embodiment. The housing 23 of digital recorder device 10 extends over the top edges of tape measure 24. The digital recorder device 10 is fixed to a measuring device using a clipping apparatus 26 extending from housing 23. Clipping apparatus 26 creates a secure connection by fastening to the clip of the measuring device. A battery 30 powers the digital recorder device 10 and is located within battery compartment 28.

Figure 7:
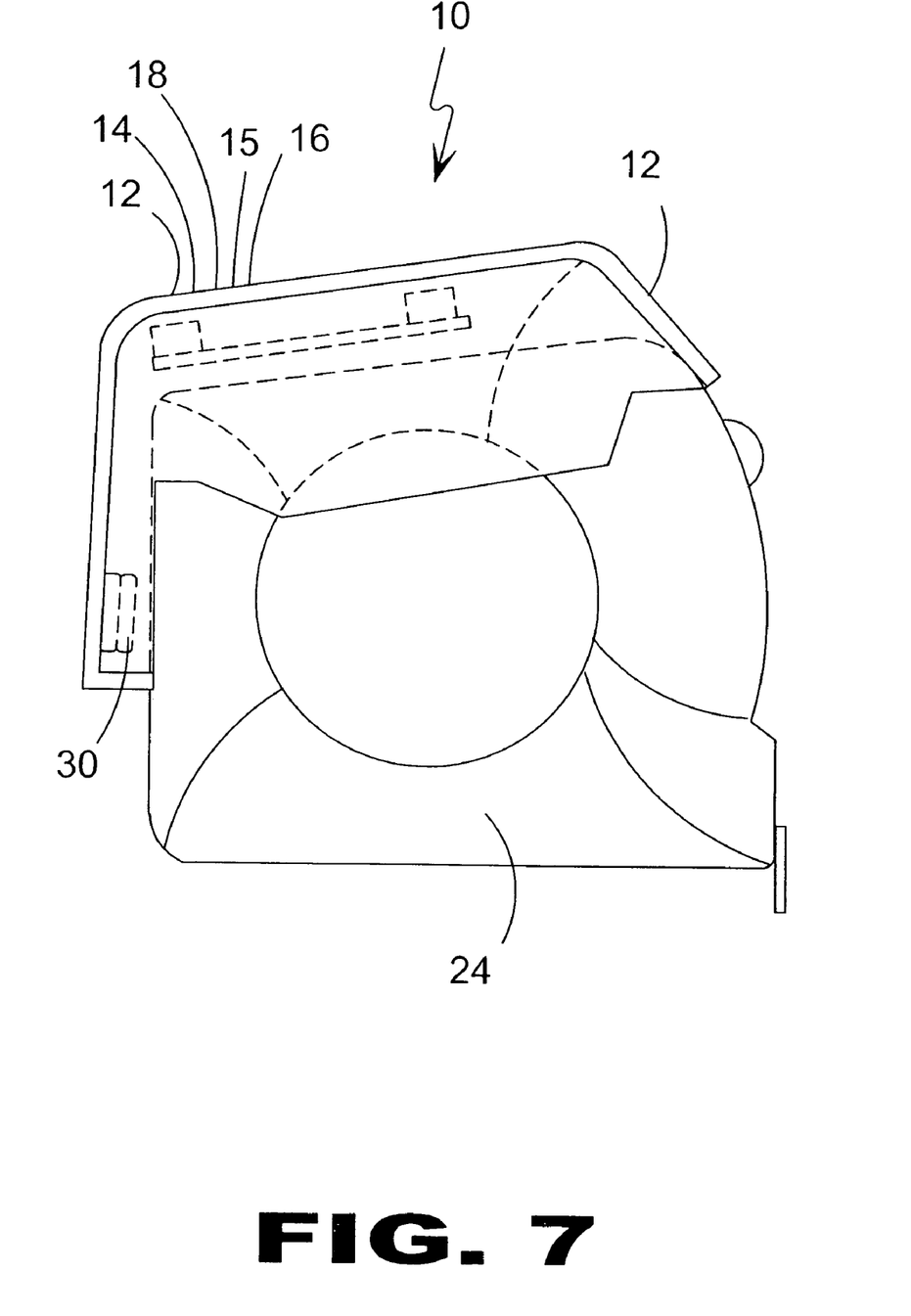
FIG. 7 is a side view of the digital recorder device of the present invention.

FIG. 7 is a side view of the digital recorder device of the present invention. The digital recorder device 10 of the present invention provides the ability to easily record measurements made using a tape measure 24, shown in FIG. 1 in a preferred embodiment. A housing 23 covers the top and extends partially down the sides of tape measure 24. The enhanced grip available to the user is provided by the exterior of the digital recorder. The digital recorder device 10 is fixed to a measuring device using a clipping apparatus 26 extending from the side of housing 23. of A battery 30 powers the digital recorder device 10 and is located within battery compartment 28. Battery 30 also powers the processor 32, which controls the numerous functions of digital recorder device 10 that will be discussed further in respect to FIG. 8.

Figure 8:
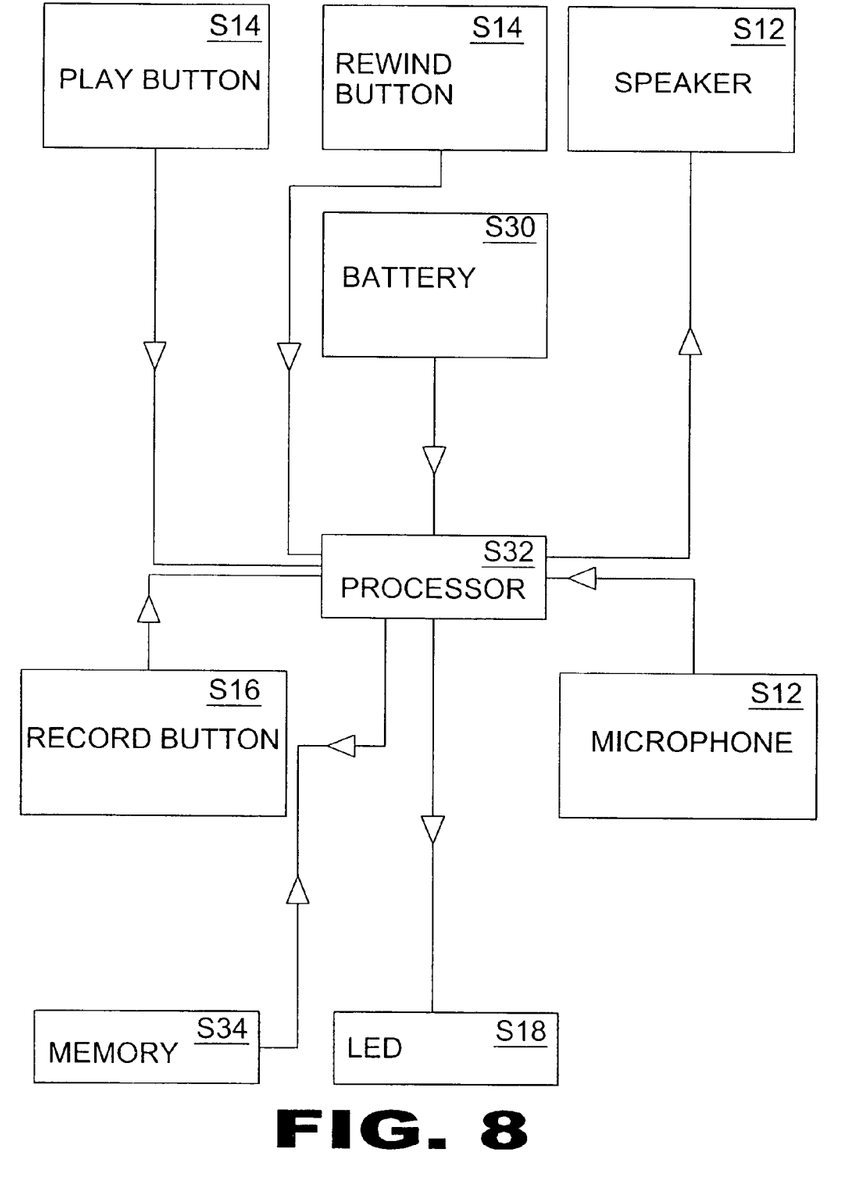
FIG. 8 is a block diagram of the digital recorder device of the present invention.

FIG. 8 is a block diagram of the digital recorder device of the present invention. The digital recorder device 10 of the present invention provides the ability to easily record measurements made using a tape measure 24, shown in FIG. 1 in a preferred embodiment. Processor s32 is the central control unit handling all operations within digital recorder device 10. Battery s30, play button s14, speaker s20, record button s16, rewind button s15, memory s34, LED s18 and microphone s12 are all connected to processor s32. Battery s30 powers processor s32 which in turn redistributes power to system components in need.

Depression of record button s16 initiates the recording process of digital recorder device 10. Upon commencement of the recording process LED s18 is illuminated for notification of the recording phase. A user speaks and microphone s12 records all available audio data for the period in which record button s16 is depressed. All recorded data is stored in memory s34. The release of record button s16 from the depressed position ceases the recording process and illumination of LED s18. This recording process can be repeated numerous times placing audio data into separate memory slots of memory s34. Depression of the rewind button s15 causes the digital recorder to reposition to the beginning of the digital data. Depression of playback button s14 initiates the playback process of digital recorder device s10. The playback process initiates the playback of all previously recorded messages stored in memory s34 through a speaker s20. A second depression of playback button s14 during playback initiates a pause and halts the playback of all previously recorded messages stored in memory s34. A subsequent depression of playback button s14 will end the pause and return to the playback of messages stored in memory 34. Simultaneous depression of record button s16 and playback button s14 initiates a memory format in which all audio data stored in memory s34 is cleared.

Figure 9:
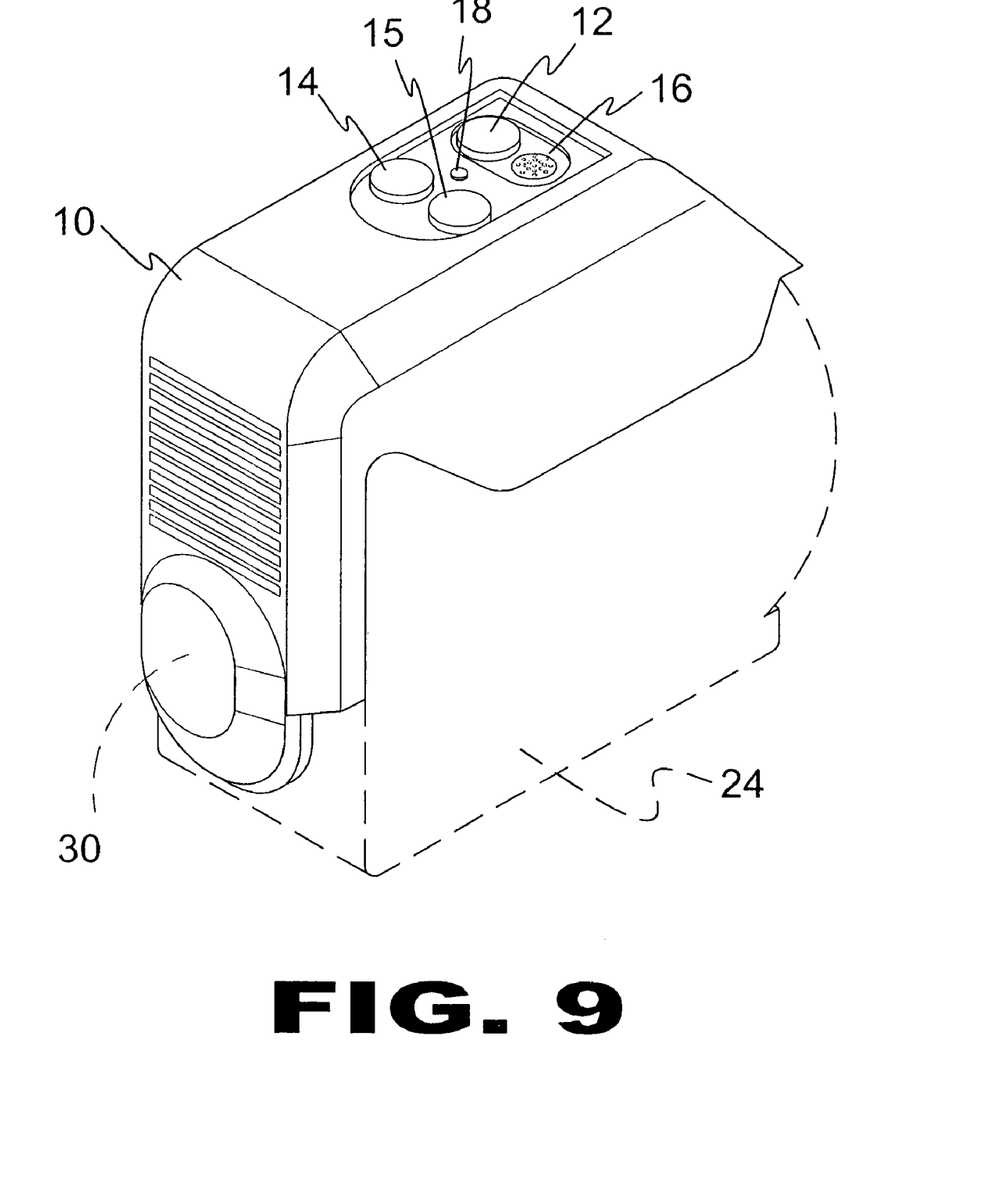
FIG. 9 is a rear perspective view of the digital recorder device of the present invention after installation.

FIG. 9 is a rear perspective view of the digital recorder device of the present invention after installation. The digital recorder device 10 of the present invention provides the ability to easily record measurements made using a tape measure 24, shown in FIG. 1 in a preferred embodiment. A housing 23 covers the top and extends partially down the sides of tape measure 24. The enhanced grip available to the user is provided by the exterior of the digital recorder. The digital recorder device 10 is fixed to a measuring device using a clipping apparatus 26 extending from the side of housing 23. of A battery 30 powers the digital recorder device 10 and is located within battery compartment 28.

Figure 10:
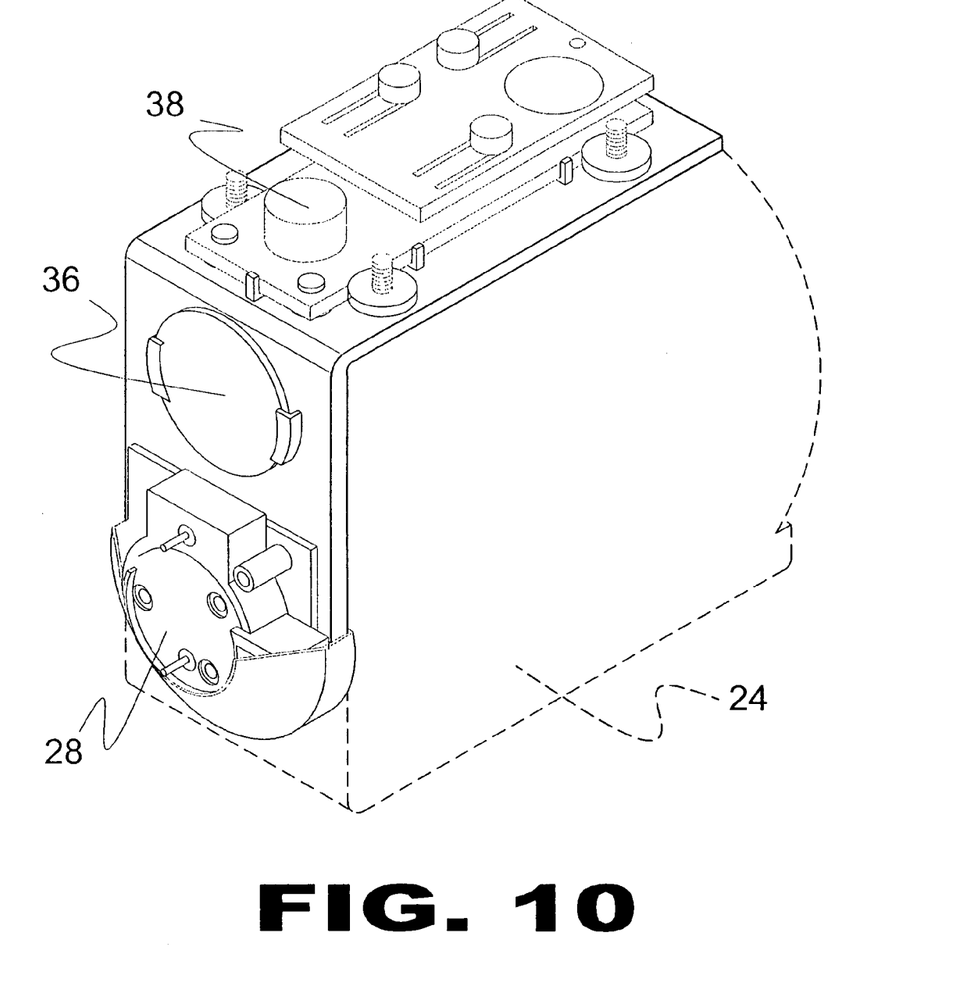
FIG. 10 is a perspective cutaway view of the digital recorder device of the present invention.

FIG. 10 is a perspective cutaway view of the digital recorder device of the present invention. The digital recorder device 10 of the present invention provides the ability to easily record measurements made using a tape measure 24, shown in FIG. 1 in a preferred embodiment. A housing 23 covers the top and extends partially down the sides of tape measure 24. The digital recorder device 10 is fixed to a measuring device using a clipping apparatus 26 extending from the side of housing 23. of A battery 30 powers the digital recorder device 10 and is located within battery compartment 28.

Figure 11:
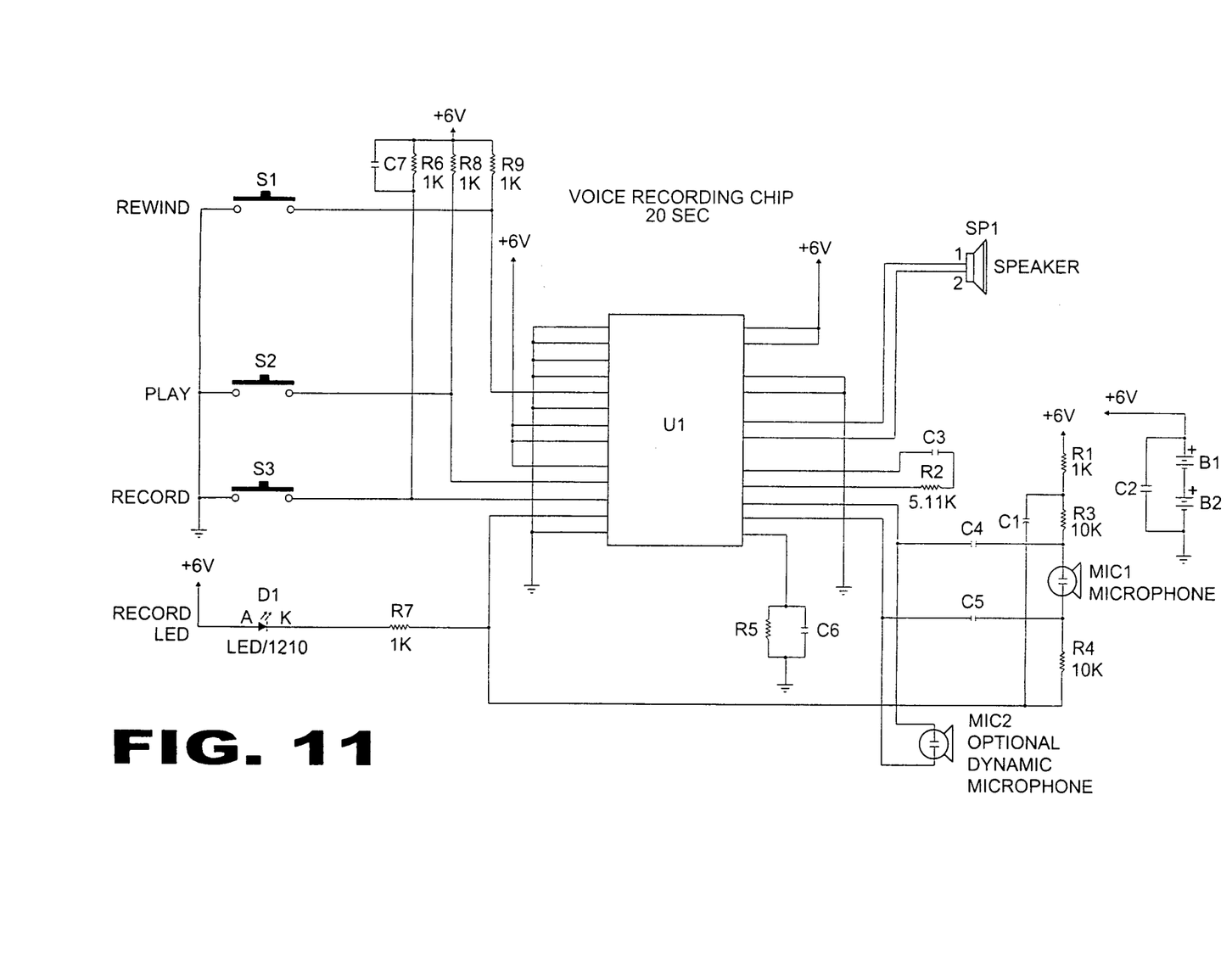
FIG. 11 is a schematic of the preferred embodiment of the present invention.

FIG. 11 is a schematic diagram of the preferred embodiment of the present invention.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A selectively attachable device for recording audio data in conjunction with a tape measure, wherein the tape measure has a top side, a first side comprising a clip, and a second side opposite the first side, the device comprising:
   a. a housing having two protrusions extending from an edge of the housing and adapted to substantially cover the top side of the tape measure and to at least partially cover the first side and the second side of the tape measure;
   b. a recorder in association with said housing for recording audible data while operating the tape measure;
   c. a rewind element in association with said recorder for rewinding back said recorded audible data;
   d. a playback element in association with said recorder for playing back said recorded audible data; and
   e. a rod disposed in generally parallel relationship relative to the edge of the housing and being interposed between the two protrusions, such that the rod is disposed away from the edge of the housing and adapted for passing the clip of the tape measure therethrough and form a mating relationship therewith.

2. The device of claim 1 wherein said recorder comprises:
   a. a processor having an input/output port;
   b. a record button connected to said processor for activation thereof;
   c. a microphone connected to said processor for selectively capturing ambient audible data; and
   e. a memory unit connected to each of said processor and said input/output port; wherein upon depressing said record button, said processor causes said microphone to capture said ambient audible data for storage in said memory unit.

3. The device of claim 2, wherein said rewind element comprises a rewind button connected to said processor.

4. The device of claim 3, wherein said processor is programmed whereby upon depressing said rewind button, said processor causes an audible data play position to move to a starting point of a recorded audio message.

5. The device of claim 2, wherein said playback element comprises a playback button connected to said processor.

6. The device of claim 5, wherein said processor is programmed whereby upon depressing said playback button, said processor causes said stored audible data in said memory unit to be output via said input/output port.

7. The device of claim 2, and further including a speaker adapted for outputting said ambient audible data from storage.

8. The device of claim 7, wherein said housing is adapted to substantially enclose all of the clip of the tape measure.

9. The device of claim 1, further comprising a visual notification mechanism for indicating the status of the recorder.

10. The device of claim 1, wherein said housing is adapted to apply pressure against the first side and the second side of the tape measure.

11. The device of claim 1, wherein said housing is releasably connectable to said tape measure.

12. The device of claim 1, wherein said tape measure is able to measure at least one of size of an object, dimension of an object, and distance between a plurality of objects.

13. The device of claim 1, further comprising a memory unit connected to each of the recorder, the rewind element, and the playback element for storing said recorded audible data therein.

14. The device of claim 13, wherein said memory unit is able to store a plurality of recorded audible data therein.

15. The device of claim 13, wherein said memory unit comprises a plurality of distinct memory blocks for storing captured data in each block thereof.

16. The device of claim 15, wherein said memory blocks are accessible by said playback element.

17. The device of claim 1, wherein said audible data corresponds to measurements taken using said tape measure.

18. A method of recording, rewinding and playing back audio data corresponding to measurements taken with a tape measure comprising:
  a. securing a recording device to the tape measure by sliding a clip of the tape measure through a space defined by an edge of the recording device, two extrusions extending from the edge of the recording device, and a rod extending between the two extrusions to form a mating relationship therewith wherein the tape measure remains fully functional after the recording device is secured thereto;
  b. activating a microphone interoperably connected to the recording device for recording an audible signal;
  c. storing the recorded audible signal in one of a plurality of audio data files;
  d. de-activating the microphone;
  e. selecting one of the audio data files;
  f. reading the selected audio data file and sending a signal to a speaker interoperably connected to the recording device; and
  outputting the audio data file as an output audible signal.

19. The method of claim 18, wherein said step of securing further comprises positioning the recording device to substantially cover a top surface of the tape measure and to apply pressure to at least two sides of the tape measure, wherein the two sides extend from two opposite edges of the top surface of the tape measure.

20. The method of claim 18, further comprising the step of notifying a user that the microphone has been activated.

* * * * *